Patented Apr. 6, 1954

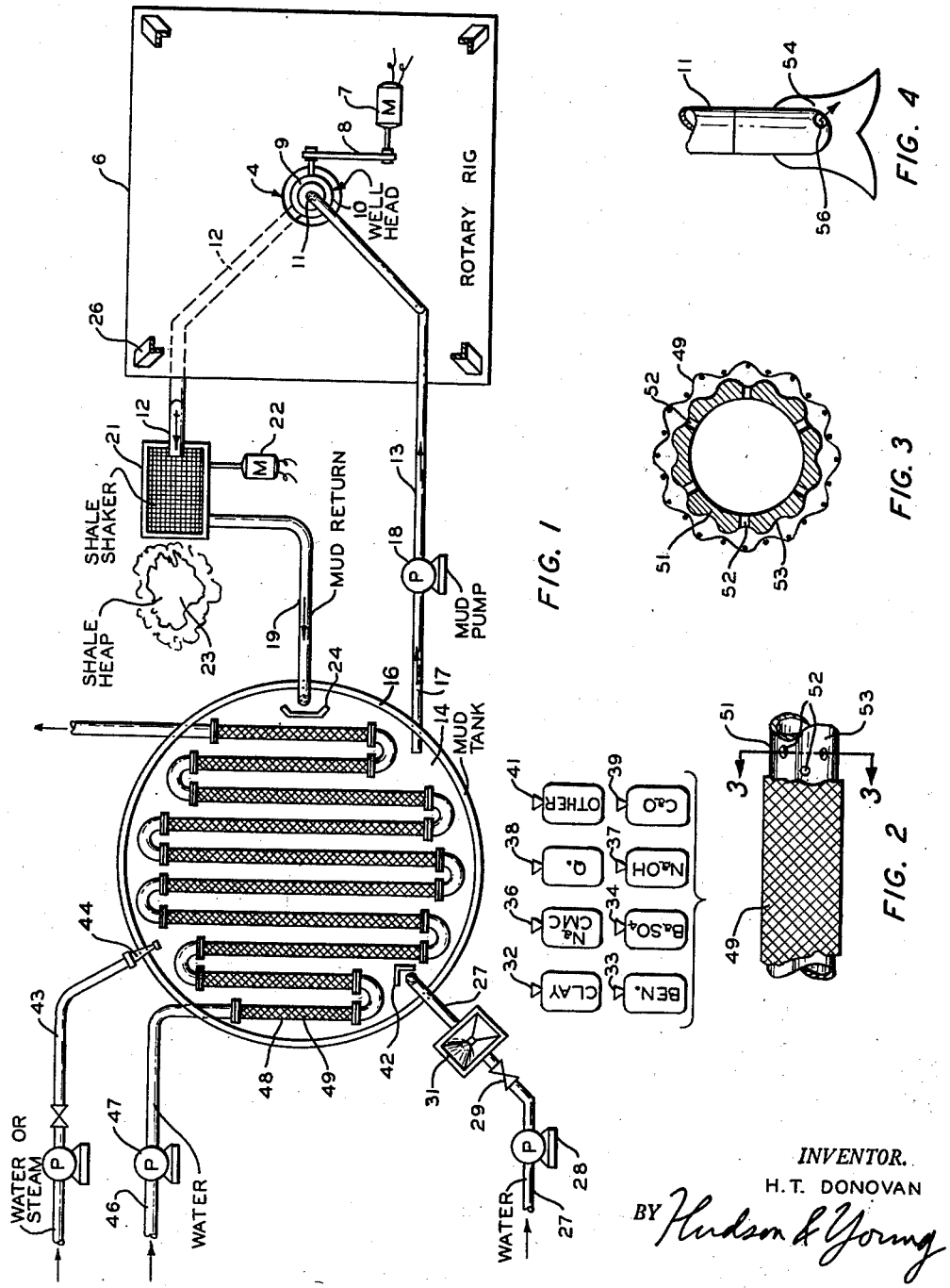

2,674,440

UNITED STATES PATENT OFFICE 2,674,440

PROCESS FOR DRILLING WELLS, INCLUDING DIALYSIS OF THE DRILLING MUD

Harry T. Donovan, Sunray, Tex., assignor to Phillips Petroleum Company, a corporation of Delaware Application February 26, 1951, Serial No. 212,748

1 Claim. (Cl. 255—1.8)

This invention relates to well drilling processes and apparatus for practicing these processes in which a water base well drilling mud is improved during the well drilling operation by removing salts from the drilling mud by dialysis through a membrane into water. In another aspect it relates to processes and apparatus for effecting control of the viscosity and gel strength of a water base well drilling mud by removing salts from said drilling mud during a well drilling operation.

In the prior art of drilling wells by the rotary method, in which a water base drilling mud containing clayey materials and/or suspended solids suspended or dispersed in water, with, or without, various drilling mud treating agents, such as sodium hydroxide, and/or quebracho, and/or water-loss controlling agents such as sodium carboxymethylcellulose or other alkali metal or ammonium carboxyalkyl cellulose ether, or sodium cellulose sulfate or other water soluble salts of cellulose sulfuric acid, with or without solid suspended weighting agents such as barium sulfate, iron ore, or lead sulfide, is circulated through the well during drilling to cool the drilling bit, bring cuttings made by the bit to the surface, form a coating on the wall of the well, and perform all the usual functions performed by well drilling mud, grave difficulties have been encountered through the solution in such well drilling muds of salts from natural formations encountered during the drilling operations. These salts immediately raise the viscosity of the drilling mud and act to destroy its thixotropic properties by greatly increasing the zero gel strength of the drilling mud and thereby making the zero gel strength substantially equal to the ten minute gel strength. Loss of thixotropic properties results in loss of all ability to support cuttings when the pumps shut down, which may result in a stuck drill stem or a twist-off. A small percentage of salt in a well drilling mud causes a large deleterious change in these properties, which can only be overcome by the addition of more treating agents such as sodium carboxymethylcellulose, or sodium cellulose sulfate, or mixtures of sodium hydroxide and quebracho, and even then such additions of extra material are undesirable because they are quite expensive and are not nearly as effective as removal of the salt causing the difficulty would be. While sodium chloride causes such difficulty, calcium chloride encountered in drilling is much worse, and calcium sulfate is still worse. Other salts give difficulty depending on their solubility and the valence of the ions created. Some give no trouble at all, for example, while barium sulfate is a salt, it gives no trouble due to its substantial insolubility. As salt contamination increases, in the prior art, more and more treating material is added until finally the drilling mud cannot be further treated. At this point the salt has affected the mud so badly that it is necessary to discard and abandon this valuable mud in which so much costly treating material has been invested, and start all over again with fresh water, clay, and new supplies of the other costly materials enumerated above.

In the present invention it has been found that if these contaminating salts are removed, especially when removed continuously during the process of drilling the well with a water base well drilling mud by dialysis through a membrane into water, that it is unnecessary to add excessive amounts of viscosity control agents and/or water-loss control agents as in the prior art. Furthermore, larger amounts of weighting agents stay suspended and the thixotropic properties of the mud are maintained. In this respect the process of dialyzing out the salts can be regarded as a process of controlling the viscosity and gel strength of a well drilling mud. While the present process and apparatus is most effective in removing salts from water base drilling mud, it can be used to remove salts from water-in-oil or oil-in-water emulsion drilling mud, or such salt water inclusions as may be picked up by oil base drilling mud, which may effect various properties of the same, such as viscosity and gel strength thereof.

One object of the present invention is to provide an improved process for drilling wells.

Another object is to provide improved apparatus for drilling wells.

A further object is to provide a process for controlling the viscosity and gel strength of well drilling fluids.

Another object is to provide apparatus for facilitating the operation of the last mentioned process.

Another object is to remove salts from well drilling fluids during the process of drilling a well by dialysis through a membrane into water.

A further object is to provide apparatus for accomplishing the last mentioned object.

Numerous other objects and advantages will be obvious to those skilled in the art upon reading the following specification, claim and drawings.

Figure 1 is a diagrammatic plane view with parts broken away of a rotary well drilling rig embodying the present invention.

Figure 2 is a fragmentary elevational view of a portion of the pipe carrying a preferred embodiment of the dializing membrane shown in Figure 1, enlarged to show details of construction.

Figure 3 is a cross-sectional view of the pipe and membrane shown in Figure 2 taken along the line 3—3 of Figure 2, looking in the direction indicated.

Figure 4 is an elevational view of a conventional fish-tail bit which may be employed in the practice of the invention.

In Figure 1 a well generally designated as 4 is being drilled by the rotary method. A conventional derrick 6 is employed, employing a conventional rotary rig. This rotary rig may comprise any motor or prime mover 7 linked by any type of power transmission means 8 to a rotary table 9 or other means for rotating the drill stem 11 in the well. While not absolutely necessary, it is conventional to have a well head 10 attached to a well casing or surface pipe (not shown) around the drill stem 11 as it enters the well, said well head being provided with a lateral discharge pipe 12 and drill stem 11 being attached by a conventional swivel connection (not shown) to a mud supply pipe 13. While the usual process employs circulation down the drill stem, many drilling operations are carried out with reverse circulation, that is, the drilling mud is pumped through pipe 12 through the well head (which may have a stuffing box or other packing around the drill stem) and emerges through drill stem 11 and pipe 13. As such is also conventional, it is deemed necessary to show only direct circulation and omit illustrating any reverse circulation. In direct circulation drilling mud 14 is taken from a part of tank 16 through intake pipe 17 by pump 18 and is forced through pipe 13 down drill stem 11, out through holes 56 in the drill bit 54 (Figure 4) and up the well around drill stem 11 to emerge through pipe 12 and be returned through channel 19 to the tank 16.

Obviously the return conduits 12 and 19 need not be pipes but can be merely ditches in the ground, pipes being shown, however.

It is customary to remove large cuttings by means of a vibrating screen 21 driven by motor 22, large cuttings going to a shale heap 23 and the fluid mud passing through pipes 19 into tank 16 where smaller cuttings may settle out to some degree. However, screen 21 can be removed and motor 22 stopped, in which case mud from 12 passes through 19 into tank 16 without removal of cuttings, the cuttings settling out in the tank, which may be aided by encountering the baffles such as 24, accumulated settled-out cuttings then being shoveled out of tank 16 from time to time. Obviously the use of shale shaker 21 is preferable to shoveling out tank 16 due to the cost of labor involved.

The derrick 6 has been shown by conventional symbols, the tops of legs 26 being shown sawed off to simplify the drawing.

The well drilling mud employed in tank 16 may be any conventional type of mud. The present invention is most effective with a water base drilling mud and therefore this type of mud will be described in more detail. However, this invention produces valuable results when employed with water-in-oil or oil-in-water emulsion drilling mud or oil base drilling mud which has water inclusions entering the drilling mud while drilling.

When employing a water base drilling mud, fresh water is added through pipe 27 provided, if necessary, with pump 28 and/or valve 29. Pipe 27 is preferably provided with a hopper 31 communicating with the interior thereof in order to add powdered additives to the drilling mud. While these powdered additives could be poured directly into tank 16, much better mixing occurs by adding them through hopper 31 into a stream of water flowing in pipe 27. If it is not desired to add more water, mud from tank 16 can be recycled through 31 to pick up the solids. The usual additives for water base drilling mud are shown conventionally in cement sacks, which is the way they are usually received. These sacks are shown lying on the ground and may comprise clay, such as kaolin 32, bentonite 33, as clayey materials; barium sulfate 34, as a weighting agent; sodium carboxymethylcellulose 36 as a water-loss reducing agent having numerous other valuable treating properties; viscosity control agents such as sodium hydroxide and quebracho 38, along with plasticizing agents such as lime 39, either slacked or unslacked, and others 41.

Suitable baffles 42 may be employed in tank 16 to direct the fluids flowing thereinto, and such baffles are generally movable as desired. Often the drilling mud in tank 16 is stirred up by jetting action of water and/or steam through a fire hose 43 having a nozzle 44.

In order to remove salts from drilling mud 14 by dialysis through a membrane into water in a preferred embodiment of the invention, water is pumped through pipe 46 by pump 47. Pipe 46 is provided with a number of sections 48 comprising a dialyzing member or membrane 49, all being shown in greater detail in enlarged Figures 2 and 3.

Membrane 49 may be ordinary substantially waterproof cotton canvas hose, which hose is made substantially waterproof by any known type close weave of the material, and not by any chemical treatment, although it is still effective even if there is some chemical treatment, sleeved over a metallic pipe 51 which is preferably provided with perforations 52. For use in this invention the ordinary close square weave cheap cotton fire hose is suitable, even though not entirely waterproof. To facilitate circulation of liquid over the surface of pipe 49, pipe 51 may be provided with suitable depressions or grooves 53 in which openings 52 communicate.

Other suitable materials for use as dialyzing membrane 49 are: Any closely woven cloth, especially the type of cloth known as canvas, which is preferably a square-meshed fabric of cotton, which can also be made of linen, silk, nylon or other staple materials, is suitable as a preferred form of the membrane in the dialysis of drilling mud in the present invention. In the present invention cruder forms of dialysis membrane can be used than in scientific investigations or chemical operations where exact separations are desired, because it makes little difference whether some of the drilling mud is lost, whether all of the salt is removed or only part, or whether some water enters the drilling mud. Obviously it is not necessary to remove all or even most of the salt in each pass because more salt is being added by the process of drilling at the same time it is being removed. However, the usual dialysis materials such as parchment paper or animal membrane can be employed except that they may work slower, may be more expensive, may tear up due to weakness, or for some other reason are less preferred. Regenerated cellulose known as "viscose," such as "Visking No. 1," "Visking No.

2" and "Visking Patettes" can be employed, even though they may have small holes in the same, as in the "Prestuck" variety. The quoted words are believed to be U. S. registered trade-marks probably owned by the Visking Corporation, 6733 West 65th Street, Chicago 38, Illinois. Any porous and permeable membrane which does not pass liquids too readily is suitable for dialysis in the present invention.

OPERATION

The process of controlling the viscosity and gel strength of well drilling mud 14 during its use in drilling well 9 comprises the operational steps of drilling with drilling tool 54 by rotating the same in contact with the formation through a rotary rig, circulating said drilling mud 14 into and out of said well through pipes 13 and 12, screening out solid particles of greater than a predetermined size from said drilling mud by shale shaker 21 and dialyzing out and washing away the salts of said drilling mud 14 into a moving stream of water 46.

This is quite effective over a period of time as the salt is being continuously removed, which has a beneficial effect on the drilling mud. When the drilling mud is contaminated by drilling through formations containing sodium chloride, calcium chloride, calcium sulfate or other water soluble salts, they are removed, thereby preventing flocculation of the mud and effectively resisting raising of the viscosity and gel strength and/or increases of water-loss to the formation.

Example A 5 per cent by weight aqueous bentonite well drilling mud containing 2 per cent salt was tested, using a rugged, durable membrane made of substantially waterproof canvas, made so by the weave of the canvas and not by chemical treatment; the salt was removed at an average rate of 1.4 grams per square inch of exposed membrane per 8 hours. This rate was established over a 20 hour period using said 2 per cent salt contaminated aqueous bentonite mud, at the end of which time 78.41 percent of the salt had been removed. The salt was sodium chloride.

Example B

Using a membrane made of "Visking," a cellophane sausage casing material consisting of regenerated cellulose, a higher rate of dialysis from the same 2 per cent salt contaminated drilling mud occurred, namely, 1.68 grams per square inch per 8 hours. The salt was sodium chloride. While the Visking No. 1 membrane had a greater rate of salt removal, it was more fragile than the canvas, and therefore the canvas tube of Example A is preferable in the field at present. However, if special extra-thick "Visking" can be obtained in the future, it may be preferred.

While the preferred embodiments of the invention have been described above, they have been selected for illustrative purposes only and the invention is not limited thereto, but is of the scope set forth in the appended claim.

Having described my invention, I claim:

In the process of controlling the viscosity and gel strength of a water base well drilling mud containing substantial amounts of clayey materials during its use in drilling a well by the steps of drilling with a drilling tool, circulating said water base drilling mud into and out of said well, screening out solid particles of greater than a predetermined size from said drilling mud coming out of said well, and dialyzing out and washing away the salts in said drilling mud by dialysis through a membrane into a moving stream of water, the improvement comprising reducing the rate of flow of said drilling mud adjacent said membrane by passing said mud slowly through an enlarged storage zone, and passing said moving stream of water inside said membrane circuitously through said enlarged zone.

References Cited in the file of this patent

UNITED STATES PATENTS

| Number | Name | Date |
|---|---|---|
| 1,825,631 | Horvath | Sept. 29, 1931 |
| 2,156,333 | Cross et al. | May 2, 1939 |
| 2,218,533 | Huebotter | Oct. 22, 1940 |
| 2,366,184 | Dean | Jan. 2, 1945 |
| 2,502,614 | Zender | Apr. 4, 1950 |
| 2,571,247 | Huebotter | Oct. 16, 1951 |